US005711085A

United States Patent [19]
Adams

[11] Patent Number: 5,711,085
[45] Date of Patent: Jan. 27, 1998

[54] WRITING INSTRUMENT HOLDING CLIP FOR RETRACTABLE TAPE

[76] Inventor: Thomas F. Adams, 3961 E. River Dr., Fort Myers, Fla. 33916

[21] Appl. No.: 650,989

[22] Filed: May 21, 1996

[51] Int. Cl.$^6$ .............. G01B 3/10; B43L 9/04; B25H 7/04
[52] U.S. Cl. .............. 33/768; 33/769; 33/770; 33/668
[58] Field of Search .............. 33/768, 755, 761, 33/769, 770, 668

[56] References Cited

U.S. PATENT DOCUMENTS

| | | | |
|---|---|---|---|
| 3,148,455 | 9/1964 | Aciego | 33/760 |
| 3,802,032 | 4/1974 | Weed . | |
| 4,111,343 | 9/1978 | Selinko . | |
| 4,296,554 | 10/1981 | Hammerstrom | 33/760 |
| 4,754,528 | 7/1988 | Lyons et al. . | |
| 4,897,898 | 2/1990 | Chapin . | |
| 4,914,830 | 4/1990 | Legaré | 33/760 |
| 4,964,225 | 10/1990 | Waldherr . | |
| 5,038,985 | 8/1991 | Chapin | 33/768 |
| 5,154,006 | 10/1992 | Wooster | 33/668 |
| 5,172,486 | 12/1992 | Waldherr | 33/770 |
| 5,477,619 | 12/1995 | Kearns | 33/668 |
| 5,577,329 | 11/1996 | States | 33/768 |

FOREIGN PATENT DOCUMENTS

| | | | |
|---|---|---|---|
| 1256340 | 6/1989 | Canada | 33/760 |

OTHER PUBLICATIONS

Stanley (registered TM) model 33-430 retractable tape measure of Stanley Tools, Div. of The Stanley Works, New Britain, CT 06050; dated 1995.

Stanley Leverlock (registered TM) retractable tape measure of Stanley Tools, Div. of The Stanley Works, New Britain, CT 06050; dated 1994.

Stanley Powerlock (registered TM) retractable tape measure of Stanley Tools, Div. of The Stanley Works, New Britain, CT 06050; dated 1994.

Retractable tape measure distributed by Home Quarters Warehouse, Virginia Beach, VA 23452; date unknown.

Retractable tape measure distributed by Kmart Corporation, Troy, MI 48084; date unknown.

*Primary Examiner*—Christopher W. Fulton
*Attorney, Agent, or Firm*—Peter D. Keefe

[57] ABSTRACT

A clip for a retractable tape measure which is structured to seatably receive a writing instrument so that the writing instrument is always present to mark the spot whenever a measurement is made, and further so that the writing instrument is located relative to the case so that accurate arcs can be drawn with respect to a nail head centerpoint. The clip includes a clip body composed of a base member for being connected to the case of a retractable tape measure, a spring member integrally connected with the base member for resiliently yielding when an article is slipped between the base and spring members. The clip further includes a writing instrument holder adjacent with the base member for removably receiving a writing instrument. The preferred clip is constructed of stainless steel sheet stock, preferably a spring type stainless steel material, wherein the clip body and the writing instrument holder are integrally formed in a single piece. A point protector for received writing instruments may be optionally included.

22 Claims, 2 Drawing Sheets

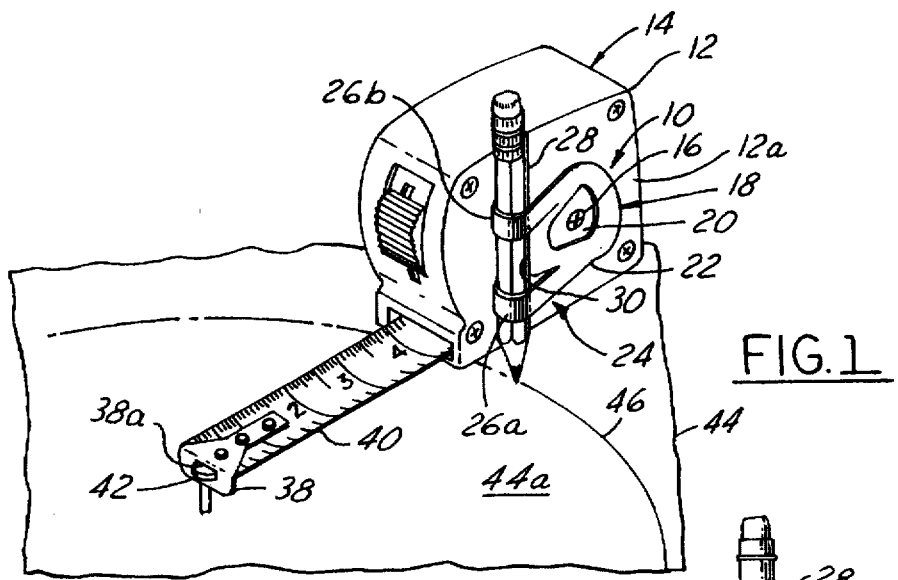
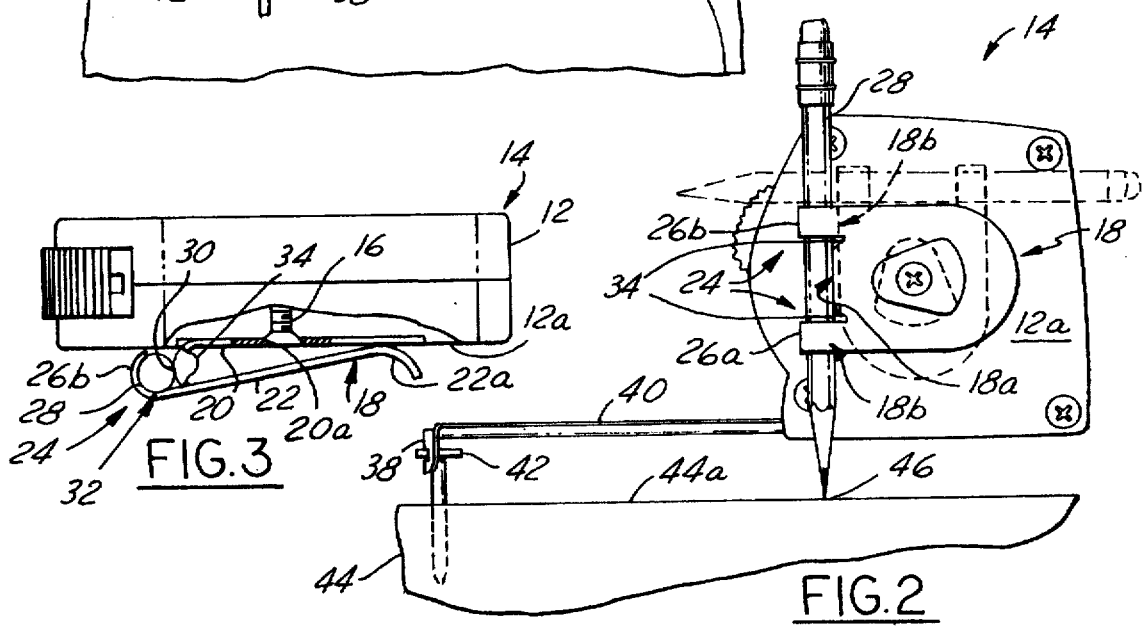
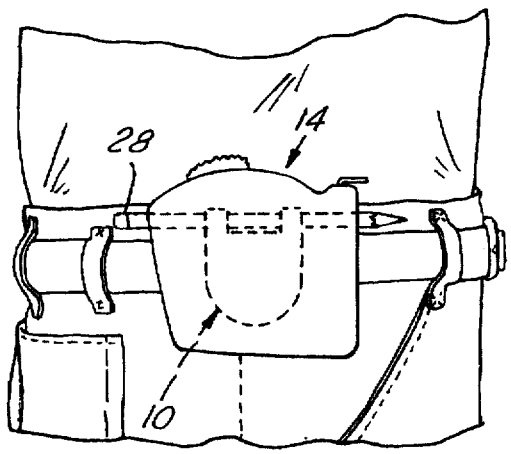
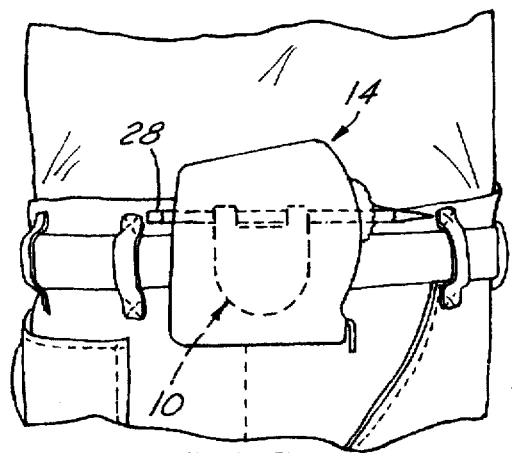

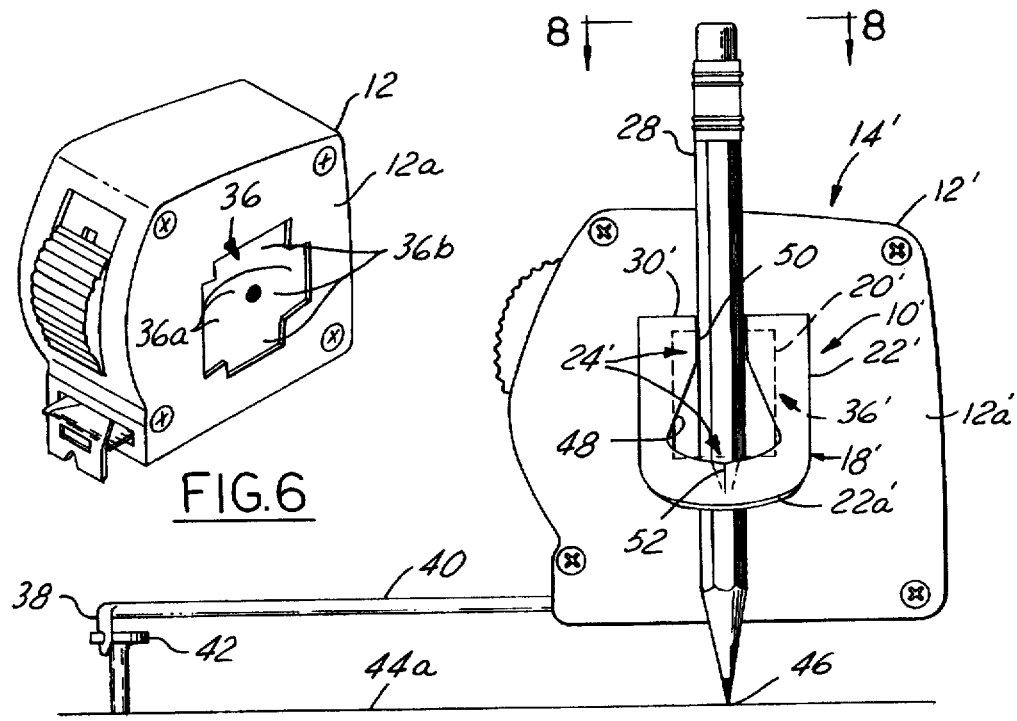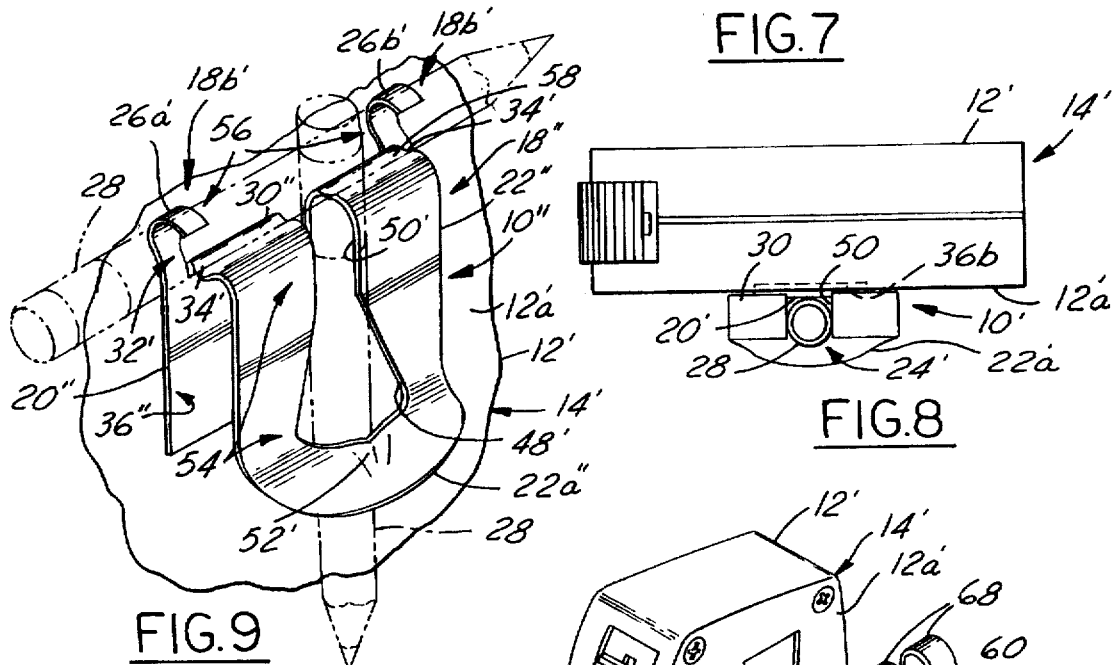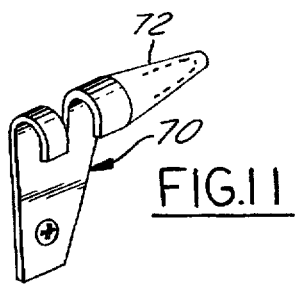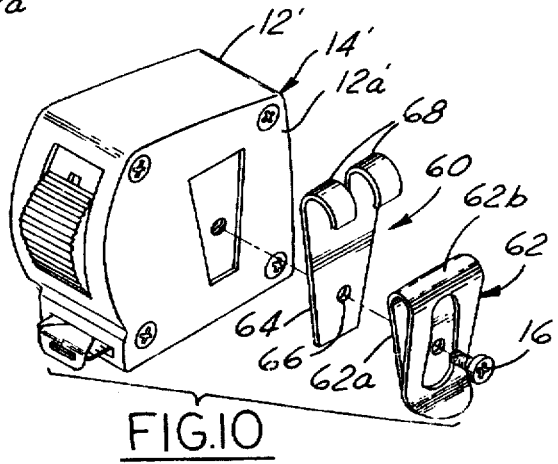

WRITING INSTRUMENT HOLDING CLIP FOR RETRACTABLE TAPE

BACKGROUND OF THE INVENTION

1. Field of the Invention

The present invention relates to clips used to releasably attach a retractable (sometimes also referred to as coilable or recoilable) tape measure to a user's clothing, and more particularly to clips for retractable tape measures having structural provision for selectively receiving a writing instrument, as for example a pencil.

2. Description of the Prior Art

Retractable tape measures have become an indispensable tool of tradespeople because of their inherent compactness, ease of use and accuracy of the provided measurement. Retractable tape measures include a case; a flexible, elongated blade upon which distance measurements are printed; a hook end typically having a special slot therein which allows a nail to serve as a pivot for drawing circles measured therefrom; a spring rewinding mechanism for retracting the blade via biased spooling thereof; a release button for selectively actuating the rewinding mechanism when the blade is extended; and a clip connected to a side of the case for clipping the case onto an article of clothing of the user, such as for example a belt.

One of the most frequent uses of a retractable tape measure is to measure a distance across an object, such as a board or sheet of building material, in preparation for its being cut or otherwise acted upon. In order for the user to remember the exact location of the measured spot, it is necessary to leave a mark on the surface of the object at the spot, usually via a writing instrument such as a pencil, pen, marker or crayon. However, since it is so easy to have accidentally placed a writing instrument out of reach when the measurement is taken, the measurement has to be repeated with the writing instrument in hand.

Further, as alluded to hereinabove, retractable tape measures may be used to draw circles on the surface of an object whereby a nail head forms the radial center, the special slot of the hook end of the blade engages the nail head, and the blade serves as a radius of various lengths. In order to provide a circle mark as accurate as possible, the user must try to hold the case and a writing instrument against the case as the case is arcingly moved about the nail head center pivot. Frequently, the actual result is not only radially inaccurate, but also the circumference is drawn unsteady (ie., wavy, somewhat sawtooth-locking) rather than drawn smoothly, especially if the surface grain is rough.

Accordingly, it would be most beneficial if somehow a writing instrument could be removably attached to a retractable tape measure so that the writing instrument is always present to mark the spot whenever a measurement is made, and further so that the writing instrument is located relative to the case so that accurate arcs can be drawn with respect to a nail head centerpoint.

SUMMARY OF THE INVENTION

The present invention is a clip for a retractable tape measure which is structured to seatably receive a writing instrument so that the writing instrument is always present to mark the spot whenever a measurement is to be made, and further so that the writing instrument is located relative to the case so that accurate arcs can be drawn with respect to a nail head (or other analogous protruding structure).

The clip according to the present invention includes a clip body composed of a base member for being anchored fastenably to the case of a retractable tape measure and a spring member integrally connected with the base member for resiliently yielding when an article is slipped between the base and spring members. The clip further includes a writing instrument holder associated with the clip body for removably receiving a writing instrument. The preferred clip is constructed of high yield spring type stainless steel sheet material, wherein the clip body and the writing instrument holder are integrally formed in a single piece.

In a first preferred embodiment of the clip according to the present invention, the clip body includes a base member shaped to seat (form fit) into a recess formed in the exterior of the rear side of the case of the retractable tape measure. The base member has an affixing hole for a threaded fastener to connect it to the case. The spring member is formed of an inboard portion of the clip body which is looped via an arcuate bend so as to generally adjacently overlap, and be resiliently biased toward, the base member. The writing instrument holder is formed of outboard portions (one on either side of the inboard portion) of the clip body which are bent into arcuate fingers adjacent the arcuate bend. It is preferred for the clip to be orientable in either of two perpendicular directions relative to the case.

In a second preferred embodiment of the clip according to the present invention, the clip body includes a base member shaped to seat (form fit) into a recess formed in the exterior of the rear side of the case of the retractable tape measure. The base member has an affixing hole for a threaded fastener to connect it to the case. The spring member is formed of the clip body by its being looped via an arcuate bend so as to generally adjacently overlap, and be resiliently biased toward, the base member. The writing instrument holder is formed of the spring member having a medial aperture and a centrally located slot in the arcuate bend that connects with the medial aperture. A writing instrument is disposed adjoining the base member by being placed into the slot and medial aperture and between the base member and the spring member at its distal end.

In a third embodiment of a clip according to the present invention, the writing instrument holders of the first and second preferred embodiments are included.

In a fourth embodiment of the clip according to the present invention, a conventional clip for a retractable tape measure is utilized in conjunction with a writing instrument holder which is connected with the case, wherein the writing instrument holder is in the form of arcuate fingers adjacent the arcuate bend of the clip.

In operation, the clip according to the present invention serves as an article clipping device in a conventional manner, wherein an article of the user's clothing is resiliently held between the spring and base members so as to selectively attach the case of the retractable tape measure to the clothing of the user. Further, the clip according to the present invention selectively holds a writing instrument which has been thrust axially into the writing instrument holder. In the event an arc is to be drawn with respect to a nail head via the hook end of the retractable tape measure, the writing instrument holder securely holds the writing instrument with respect to the case so that the resulting drawn circumference is both accurate and smooth. The advantage of the first, third and fourth preferred embodiments of the clip according to the present invention is that the spring member and the writing instrument holder are able to operate independently, so that a writing instrument may be received while the clip is simultaneously engaged with an article of clothing.

Accordingly, it is an object of the present invention to provide a clip which has provision for releasably holding a writing instrument.

It is an additional object of the present invention to provide a clip for a retractable tape measure, wherein the clip functions to attach the retractable tape measure to an article of clothing of the user and further functions simultaneously to releasably retain a writing instrument.

It is another object of the present invention to provide a clip for a retractable tape measure which provides location for a writing instrument with respect to the case of the retractable tape measure when the retractable tape measure is being used to draw a circumference.

It is a further object of the present invention to provide retractable tape measure, wherein the clip thereof is positionable in selected orientations, preferably in mutually perpendicular orientations.

It is yet a further object of the present invention to provide a writing instrument holder for retrofitting with a conventional clip of a retractable tape measure or another object.

These, and additional objects, advantages, features and benefits of the present invention will become apparent from the following specification.

BRIEF DESCRIPTION OF THE DRAWINGS

FIG. 1 is a perspective view of a clip according to a first embodiment of the present invention, shown in operation with respect to a writing instrument and at a first orientation with respect to a retractable tape measure.

FIG. 2 is a rear side view of a retractable tape measure equipped with the clip according to the first embodiment of the present invention, wherein the clip is shown at the first orientation, and shown in phantom at a second, perpendicular, orientation.

FIG. 3 is a top, partly broken-away, partly sectional view of the retractable tape measure equipped with the clip according to the first embodiment of the present invention.

FIG. 4 is a front side view of a retractable tape measure shown in operation wherein the clip is holding a writing instrument and is clipped onto a user's belt, where the clip according to the first embodiment of the present invention is in the first orientation.

FIG. 5 is a front side view of a retractable tape measure shown in operation where the clip is holding a writing instrument and is clipped onto a user's belt, where the clip according to the first embodiment of the present invention is in the second orientation.

FIG. 6 is a perspective view of a retractable tape measure showing the rear side thereof having a bidirectional recess for seating a clip according to the present invention in two mutually perpendicular orientations.

FIG. 7 is a rear side view of a retractable tape measure equipped with a clip according to a second embodiment of the present invention, wherein the clip is shown in operation holding a writing instrument during the drawing of an arc.

FIG. 8 is a top plan view of a retractable tape measure equipped with the clip according to the second embodiment of the present invention, shown in operation holding a writing instrument.

FIG. 9 is a perspective view of a clip according to a third preferred embodiment of the present invention, shown in operation with respect to writing instruments (shown in phantom).

FIG. 10 is an exploded perspective view of a retractable tape measure, conventional clip therefor and writing instrument holder according to a fourth embodiment of the present invention.

FIG. 11 is a side view of a writing instrument holder according to the present invention equipped with a writing instrument point protector.

DETAILED DESCRIPTION OF THE PREFERRED EMBODIMENT

Referring now to the Drawing, a clip 10 according to a first embodiment of the present invention is shown by FIGS. 1 through 6. The clip 10 is attached to the rear side 12a of the case 12 of a retractable tape measure 14 via, for example, a threaded fastener 16. The clip 10 serves to clippingly hold the retractable tape measure 14 to an article of the user's clothing, such as for example a belt, and further serves to releasably hold a writing instrument, such as for example a pen, pencil, crayon or marker, proximate the case 12.

The clip 10 includes a clip body 18 having a base member 20 and a spring member 22, preferably formed of a single piece of sheet stock, where the sheet stock is preferred to be a spring type stainless steel. The base member 20 is structured to be affixed to the rear side 12a of the case 12. The spring member 22 is formed by an arcuate bend 30 formed in an inboard portion 18a of the clip body 18 commencing at the base member 20, wherein the spring member is looped back so as to be resiliently biased against the base member. The spring member 22 is preferred to have an outwardly curved distal end 22a for facilitating slipping an article, such as a user's belt, between the spring member and the base member. In this regard, the clip body 18 serves to clippingly attach the case 12 to an article of clothing of the user, such as a belt, via resilient biasing vis-a-vis the base and spring members 20, 22 when the article is slid therebetween. The base member includes an affixing hole 20a through which the threaded fastener 16 extends and then threadably fastens to the case 12.

The clip 10 further includes a writing instrument holder 24 integrally connected with the clip body 18. The writing instrument holder 24 is formed by an outboard portion 18b of the clip body 18 being curvably bent to thereby form two spaced apart arcuate fingers 26a, 26b located adjacent the arcuate bend 30 of the clip body 18. It is to be understood that while the writing instrument holder 24 is preferred to be integrally connected with the clip body 18, this is not a requirement. The convex surface of the arcuate bend 30, the concave surface of each of the arcuate fingers 26a, 26b and the immediately adjacent surface of the rear side 12a of the case 12 collectively form a receptacle 32 (as best shown by FIG. 3) for receiving a writing instrument 28 by the writing instrument being axially slid thereinto. With respect to facilitating sliding of the writing instrument 28 into the receptacle 32, a bevel 34 is provided at each end of the arcuate bend 30 (see FIGS. 2 and 3). Thus, as a user begins to insert the writing instrument axially into the receptacle 32, the bevels 34 guide entry of the writing instrument 28 and further serve to save the surface of the writing instrument from being scarred, as would otherwise occur as the writing instrument scraped against an end of the arcuate bend 30.

The rear side 12a of the case 12 is preferably provided with a recess into which the base member 20 of the clip body 18 seats. As depicted by FIG. 6, it is preferred for the recess 36 to have a bidirectional pattern, whereby the base member 20 is seatable selectably in either of two mutually perpendicular orientations relative to the case 12, as shown in FIGS. 4 and 5. That is, when the base member 20 seats in a first portion 36a of the recess 36, the clip 10 is oriented at a first orientation relative to the case 12 as shown in FIG. 4; and when the base member seats in a second portion 36b of the recess, the clip is oriented at a second orientation relative to the case as shown in FIG. 5. An advantage of the base member 20 being seated in the first portion 36a of the recess 36, whereby the clip 10 is oriented in the first orientation as shown in FIG. 1, is that the writing instrument 28 is in ready position to draw a circumference line 46.

In operation, a user uses the clip body 18 to clippably attach the case 12 to an article of the user's clothing in a conventional manner. The user slips, axially, a writing instrument 28 into the receptacle 32 formed between the arcuate fingers 26a, 26b, the arcuate bend 30 and the surface 12a of the case 12 to thereby hold the writing instrument to the casing 12. In this regard, FIG. 1 depicts an example of operation wherein the special slot 38a of the hook end 38 of the blade 40 of the retractable tape measure 14 engaged with a nail head 42, wherein a circle circumference is desired to be drawn on the surface 44a of an object 44. The writing instrument 28 is located fixedly with respect to the case 12 so that as the user moves the case arcingly about the nail head 42, the writing instrument provides a smooth and accurately radiused circumferential line 46.

Referring now additionally to FIGS. 7 and 8, a second preferred embodiment of the clip 10' will be detailed.

The writing instrument 28 and the retractable measuring tape 14', including the case 12' and rear side 12a', are as above recounted, with the exception that the recess 36' is conventionally configured, where the recess is shaped analogous to that of the second portion 36b of the recess 36 shown in FIG. 6.

The clip 10' includes a clip body 18' having a base member 20' and a spring member 22', preferably, as in the case of the clip body 18, formed of a single piece of sheet stock, wherein the sheet stock is preferred to be a spring type stainless steel. The spring member 22' is formed by an arcuate bend 30' formed of the clip body 18' commencing at the base member 20', where the spring member is looped back so as to be resiliently biased against the base member. A medial aperture 48 of general shape is provided in the spring member 22' and a slot 50 is provided in a central section of the arcuate bend 30' which extends into the medial aperture.

The spring member 22' is preferred to have an outwardly curved distal end 22a' for facilitating slipping an article between the base and spring members, as described hereinabove relative to the first embodiment of the clip 10. The base member 20' seats into the recess 36', and is connected with the rear surface 12a' of the case 12' in the manner described hereinabove.

The writing instrument holder 24' of the clip 10' includes the aforementioned slot 50 and medial aperture 48, and preferably includes a shallow bend 52 formed in the distal end 22a' of the spring member 22' at the medial aperture and directly in line with the slot. In this regard, the writing instrument 28 is slid axially through the slot 50, through the medial aperture 48 and then between the base member 20' and the distal end 22a' of the spring member 22 at the shallow bend 52, wherein the shallow bend receives the writing instrument and the sides of the slot and the shallow bend serve to guide the orientation of the writing instrument with respect to the case, and wherein the biasing of the spring member against the writing instrument serves to squeeze it fixedly, yet releasably, in place relative to the clip 10'.

FIG. 7 depicts an example of operation wherein the hook end 38 of the blade 40 of the retractable tape measure 14' engaged with a nail head 42, wherein a circumferential line 46 is desired to be drawn on the surface 44a of an object 44. The writing instrument 28 is located fixedly with respect to the case 12' via the writing instrument holder 24' so that as the user moves the case arcingly about the nail head 42, the writing instrument provides a smooth and accurately radiused circumferential line 46.

Referring now additionally to FIG. 9, a third preferred embodiment of the clip 10" will be detailed, wherein first and second writing instrument holders 54, 56 are provided.

The writing instrument 28 and the retractable measuring tape 14', including the case 12' and rear side 12a', are as above recounted, with the exception that the recess 36" is, by way of exemplification, similar to that shown by FIG. 7 for seatably receiving a similarly shaped base member.

The clip 10" includes a clip body 18" having a base member 20" and a spring member 22", preferably, as in the case of the clip body 18, formed of a single piece of sheet stock, preferably spring type stainless steel. The spring member 22" is formed by an arcuate bend 30" formed of the clip body 18" commencing at the base member 20", wherein the spring member is looped back so as to be resiliently biased against the base member. A medial aperture 48' of general shape is provided in the spring member 22" and a slot 50' is provided in a central section of the arcuate bend 30" which extends into the medial aperture.

The spring member 22" is preferred to have an outwardly curved distal end 22a" for facilitating slipping an article between the base and spring members, as described hereinabove relative to the first embodiment of the clip 10. The base member 20" seats into the recess 36" and is thereupon connected with the rear surface 12a' of the case 12' in the manner described hereinabove.

The first writing instrument holder 54 of the clip 10" is similar to that of the writing instrument holder 24' of the second preferred embodiment of the clip 10', and includes the slot 50' and medial aperture 48', and preferably includes a shallow bend 52' formed in the distal end 22a" of the spring member 22" at the medial aperture and directly in line with the slot. In operation of the first writing instrument holder 54, the writing instrument 28 is slid axially through the slot 50', through the medial aperture 48' and then between the base member 20" and the distal end 22a" of the spring member 22' at the shallow bend 52', wherein the sides of the slot and the shallow bend serve to guide the orientation of the writing instrument with respect to the case, and the biasing of the spring member against the writing instrument squeezably holds it fixedly, yet releasably, in place relative to the clip 10'.

The second writing instrument holder 56 of the clip 10" is somewhat similar to that of the writing instrument holder 24 of the first preferred embodiment of the clip 10, and is integrally connected with the clip body 18". The second writing instrument holder 56 is formed by an outboard portion 18b' of the clip body 18" being curvably bent to thereby form two spaced apart arcuate fingers 26a', 26b' located adjacent the arcuate bend 30' of the clip body 18, wherein the bend direction is opposite that shown in FIG. 3. A groove 58 is formed in the convex surface of the arcuate bend 30". The surface of the arcuate bend 30" at the groove 58 and the concave surface of the first and second arcuate fingers 26a', 26b' form a receptacle 32' for receiving a writing instrument 28. A bevel 34' may be optionally provided at each end of the arcuate bend 30". In operation of the second writing instrument holder 56, a writing instrument 28 is axially slid concentrically with respect to each of the first and second arcuate fingers 26a', 26b' and the groove 58 to thereby become received in the receptacle 32'.

Referring now additionally to FIG. 10, a fourth preferred embodiment of the clip will be detailed, wherein a writing instrument holder 60 is provided for operation with respect to a conventional clip 62.

The retractable tape measure 14' is conventional and the clip 62 associated therewith is conventional. The writing instrument holder 60 is formed of a single piece of sheet stock, such as stainless steel The writing instrument holder 60 includes a base 64 having an affixing hole 66 for being engaged by a threaded fastener 16. In this regard, the user removes the threaded fastener 16, places the base 64 between the base member 62a of the conventional clip 62 and the rear side 12a' of the case 12', and then re-threads the threaded fastener with respect to the case.

The writing instrument holder 60 further includes one or more, preferably two, as shown, arcuate fingers 68. The arcuate fingers 68 are spaced relative to the arcuate bend 62b of the conventional clip 62 generally similar to that depicted in FIG. 9, so that a writing instrument is axially insertable into the receptacle formed between the concave surface of the arcuate fingers and the convex surface of the arcuate bend, whereby the writing instrument is inserted thereto as recounted with respect to FIG. 9 (sans the groove). In this manner, a conventional retractable tape measure is easily converted to having a writing instrument holder without need for replacing or modifying any parts thereof. The writing instrument holder 60 may be attached to other articles via a suitable threaded fastener.

It should be noted that while the writing instrument holder 60 is shown in FIG. 10 in a conventional orientation, it may be rotated 90 degrees to thereby orient the writing instrument carried by it so that the writing instrument may be used to draw a circumferential line with the retractable tape measure.

FIG. 11 depots a modification of a writing instrument holder 70 according to the present invention, wherein one end thereof is provided with a point protector 72. Preferably, the point protector 72 is generally conical in shape and is interiorly dimensioned to receive the pointed end of a writing instrument, such as a pencil, so as to protect to point from damage, as well as prevent the point from accidentally in,ring the user when the writing instrument is held by the writing instrument holder 70. It should be noted that the examples of writing instrument holders of FIGS. 1 through 6, the second writing instrument holder of FIG. 9, and FIG. 10 may be provided with the point protector.

It should be noted that the arcuate fingers disclosed herein may operate to hold a writing instrument with or without the assistance of the arcuate bend of the clip.

To those skilled in the art to which this invention appertains, the above described preferred embodiment may be subject to change or modification. For example, while the preferred article for being connected with the writing instrument holding clip according to the present invention is a retractable tape measure, other articles may be so connected, such as for example a pager, cellular telephone or calculator. Such change or modification can be carried out without departing from the scope of the invention, which is intended to be limited only by the scope of the appended claims.

What is claimed is:

1. A clip for releasably clipping one article to another article, comprising:
  a clip body comprising:
    a base member for being attached to an article; and
    a spring member integrally connected with said base member, wherein said spring member is resiliently biased toward said base member;
  wherein said base member and said spring member collectively form said clip body; and
  writing instrument holder means for holding a writing instrument in a removably fixed location with respect to said clip body;
  wherein said spring member has a bend formed in said clip body whereat said spring member is connected with said base member at said bend; further wherein said writing instrument holder means comprises:
    said spring member having a slot formed therein at said bend; and
    a medial aperture formed in said spring member, said slot interconnecting with said medial aperture;
  wherein a writing instrument is removably held by said writing instrument holder means by the writing instrument being received in said slot and said medial aperture and biasably squeezed between said spring and base members.

2. The clip of claim 1, wherein said writing instrument holder means is integrally connected with said clip body.

3. The clip of claim 2, wherein said spring member has a shallow bend formed therein adjacent said medial aperture, said shallow bend being located in line with said slot and said medial aperture.

4. A clip for releasably clipping one article to another article, comprising:
  a clip body comprising:
    a base member for being attached to an article; and
    a spring member integrally connected with said base member, wherein said spring member is resiliently biased toward said base member;
  wherein said base member and said spring member collectively form said clip body; and
  writing instrument holder means for holding a writing instrument in a removably fixed location with respect to said clip body;
  wherein said spring member has a bend formed in said clip body whereat said spring member is connected with said base member at said bend; further wherein said writing instrument holder means comprises at least one arcuate finger disposed adjacent said bend of said spring member so as to thereby cooperate with said bend to collectively provide said writing instrument holder means.

5. The clip of claim 4, wherein said bend has a first end and an opposite second end; further comprising a bevel located at each of said first and second ends of said bend.

6. The clip of claim 5, wherein said bend has a groove formed therein facing said at least one arcuate finger.

7. The clip of claim 6, wherein said bend is formed of an inboard portion of said clip body; and wherein said at least one arcuate finger comprises two arcuate fingers formed in an outboard portion of said clip body.

8. The clip of claim 5, wherein said at least one arcuate finger is integrally connected with said spring member and arcingly bent toward said base member, wherein said at least one arcuate finger and said bend of said spring member collectively provide a receptacle for receiving a writing instrument.

9. The clip of claim 8, further comprising point protector means connected with said at least one arcuate finger for protectively receiving a point of a writing instrument received in said receptacle.

10. The clip of claim 6, wherein said at least one arcuate finger is integrally connected with said base member and arcingly bent toward said spring member, wherein said at least one arcuate finger and said bend of said spring member collectively provide a receptacle for receiving a writing instrument.

11. The clip of claim 10, further comprising point protector means connected with said at least one arcuate finger for protectively receiving a point of a writing instrument received in said receptacle.

12. The clip of claim 4, wherein said writing instrument holder means further comprises:
  a second instrument holder comprising:
    said spring member having a slot formed therein at said bend; and
    a medial aperture formed in said spring member, said slot interconnecting with said medial aperture;
    wherein a writing instrument is removably held by said first writing instrument holder by the writing instrument being received in said slot and said medial aperture and biasably squeezed between said spring and base members.

13. A retractable tape measure and clip therefor for releasably clipping one article to another article, comprising:
  a retractable tape measure comprising:
    a case having a rear side; and
    blade means retractably disposed with respect to said case; and
  a clip body comprising:
    a base member attached to said rear side; and
    a spring member integrally connected with said base member, wherein said spring member is resiliently biased toward said base member;
    wherein said base member and said spring member collectively form said clip body; and
  writing instrument holder means for holding a writing instrument in a removably fixed location with respect to said case;
  wherein said writing instrument holder means is integrally connected with said clip body;
  wherein said rear side of said case is provided with a recess for seatably receiving said base member, said recess being bidirectional comprising a first portion having a first orientation and a second portion having a second orientation perpendicular to said first orientation so that said base member is selectively orientable with respect to said case in either of two mutually perpendicular orientations.

14. The retractable tape measure and clip therefor of claim 13, wherein said spring member has a bend formed therein whereat said spring member is connected with said base member; further wherein said writing instrument holder means comprises at least one arcuate finger disposed adjacent said bend of said spring member.

15. The retractable tape measure and clip of claim 14, wherein said bend has a groove formed therein facing said at least one arcuate finger.

16. The retractable tape measure and clip of claim 14, further comprising point protector means connected with said at least one arcuate finger for protectively receiving a point of a writing instrument received in said at least one arcuate finger.

17. The retractable tape measure and clip of claim 14, wherein said bend has a first end and an opposite second end; further comprising a bevel located at each of said first and second ends of said bend.

18. The retractable tape measure and clip of claim 13, wherein said spring member has a bend formed therein whereat said spring member is connected with said base member; further wherein said writing instrument holder means comprises:
  said spring member having a slot formed therein at said bend; and
  a medial aperture formed in said spring member, said slot interconnecting with said medial aperture;
  wherein a writing instrument is removably held by said writing instrument holder means by the writing instrument being received in said slot and said medial aperture and biasably squeezed between said spring and base members.

19. The retractable tape measure and clip of claim 18, wherein said spring member has a shallow bend formed therein adjacent said medial aperture, said shallow bend being located in line with said slot and said medial aperture.

20. A writing instrument holder and clip for being connected to an article, comprising:
  a clip having a clip body comprising a base member and a spring member; said spring member being integrally connected with the base member at a bend formed in said clip body;
  fastener means for fastening the clip to an article; and
  a writing instrument holder comprising:
    a base having fastening means for interfacing said base with said fastener means; and
    at least one arcuate finger disposed at one end of said base;
    wherein when said base is fastened to an article via said fastening means, said base is located between the article and said base member of said clip and said at least one arcuate finger is located adjacent said bend of said spring member of said clip so as to thereby cooperate with said bend to collectively provide said writing instrument holder means.

21. The clip of claim 20, further comprising point protector means connected with said at least one arcuate finger for protectively receiving a point of a writing instrument received in said at least one arcuate finger.

22. The clip of claim 20, wherein said at least one arcuate finger and said bend of said spring member collectively provide a receptacle for receiving a writing instrument.

* * * * *